(12) United States Patent
Nagataki

(10) Patent No.: US 8,217,599 B2
(45) Date of Patent: Jul. 10, 2012

(54) REGENERATIVE BRAKING APPARATUS

(75) Inventor: Yoshihiro Nagataki, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 341 days.

(21) Appl. No.: 12/306,672

(22) PCT Filed: Jun. 29, 2006

(86) PCT No.: PCT/JP2006/313019
§ 371 (c)(1),
(2), (4) Date: Dec. 24, 2008

(87) PCT Pub. No.: WO2008/001450
PCT Pub. Date: Jan. 3, 2008

(65) Prior Publication Data
US 2009/0200969 A1    Aug. 13, 2009

(51) Int. Cl.
*H02P 3/00*    (2006.01)
*H02P 3/14*    (2006.01)

(52) U.S. Cl. ........ 318/376; 318/375; 318/800; 318/812; 318/143; 318/153; 318/156

(58) Field of Classification Search .......... 318/376, 318/375, 800, 812, 143, 153, 156
See application file for complete search history.

(56) References Cited

U.S. PATENT DOCUMENTS 6,702,052 B1    3/2004  Wakashiro et al.
7,012,392 B2 *  3/2006  Nguyen et al. ................ 318/376

FOREIGN PATENT DOCUMENTS

| JP | 59-127584 A | 7/1984 |
| JP | 05-115187 A | 5/1993 |
| JP | 05-168287 A | 7/1993 |
| JP | 10-131206 A | 5/1998 |
| JP | 2000-037087 A | 2/2000 |
| KR | 10-0370675 B1 | 2/2003 |

* cited by examiner

*Primary Examiner* — Walter Benson
*Assistant Examiner* — Erick Glass
(74) *Attorney, Agent, or Firm* — Sughrue Mion, PLLC

(57) ABSTRACT

In a regenerative braking apparatus that is connected to a power supply apparatus that supplies electric power to a load, and consumes regenerative power regenerated from a load side together with other regenerative braking apparatuses that are connected to the power supply apparatus, an operation-level changing unit calculates, as occasion demands, according to energization time of a consuming unit, a lower limit of an operation level for judging whether an energizing unit should be actuated and changing and outputting the calculated lower limit of the operation level, a comparing unit compares the lower limit of the operation level output from the operation-level changing unit and a monitor output of a monitoring unit, and the energizing unit operates when the monitor output exceeds the lower limit of the operation level by a driving unit.

5 Claims, 3 Drawing Sheets

REGENERATIVE BRAKING APPARATUS

TECHNICAL FIELD

The present invention relates to a regenerative braking apparatus that is connected to a power supply apparatus such as an inverter apparatus that supplies electric power to a load, and that consumes regenerative power regenerated from the load side.

BACKGROUND ART

When a plurality of regenerative braking apparatuses is connected in parallel to a power supply apparatus such as an inverter apparatus, operation levels of the respective regenerative braking apparatuses are not uniform because of component tolerance or the like. Therefore, a situation in which operations concentrate only on a part of the regenerative braking apparatuses occurs. In particular, when the nonuniformity of the operations occur among such regenerative braking apparatuses, deterioration in components of the regenerative braking apparatus on which the operations concentrate progresses rapidly, leading to a fall in reliability of an entire system. Therefore, it is necessary to prevent the operations from concentrating only on a part of the regenerative braking apparatuses and secure uniformity of the operations among the regenerative braking apparatuses.

For example, Patent Document 1 described below discloses a technology for preventing, even if an error occurs in braking setting levels of respective braking apparatuses connected in parallel to an inverter apparatus, duty from concentrating on switching elements and braking resistors of specific braking apparatuses.

Patent Document 1: Japanese Patent Application Laid-open No. 10-131206

DISCLOSURE OF INVENTION

Problem to be Solved by the Invention

However, in the technology disclosed in Patent Document 1, each of the braking apparatuses needs to output a braking start signal generated by the braking apparatus to the other braking apparatuses and cause the other braking apparatuses to input braking start signals generated by the other braking apparatuses to the braking apparatus. In other words, the braking apparatuses need to be connected in parallel by a plurality of signal lines (control lines). Therefore, there is a problem in that, according to an increase in the number of braking apparatuses, the connection becomes complicated and reliability of an entire system falls because of breaking of wire, connection failure, or the like.

The present invention has been made in view of the above and it is an object of the present invention to uniformly actuate, when a plurality of regenerative braking apparatuses is connected to a power supply apparatus such as an inverter apparatus, the respective apparatuses even when there is component tolerance or the like in operation levels of the respective apparatuses and make it unnecessary to connect the apparatuses using control lines or the like, and provide a regenerative braking apparatus that does not bring about a fall in reliability.

Means for Solving Problem

To solve the problems and achieve the object mentioned above, according to an aspect of the present invention, a regenerative braking apparatus that is connected to a power supply apparatus that supplies electric power to a load, and consumes regenerative power regenerated from a load side together with other regenerative braking apparatuses that are connected to the power supply apparatus, the regenerative braking apparatus includes: a consuming unit that consumes the regenerative power; an energizing unit that energizes the consuming unit with the regenerative power; a monitoring unit that monitors the regenerative power; an operation-level changing unit that calculates, as occasion demands, according to energization time of the consuming unit, a lower limit of an operation level for judging whether the energizing unit should be actuated and changing and outputting the calculated lower limit of the operation level, a comparing unit that compares the lower limit of the operation level output from the operation-level changing unit and a monitor output of the monitoring unit; and a driving unit that drives the energizing unit based on a result of the comparison by the comparing unit, wherein the energizing unit operates when the monitor output exceeds the lower limit of the operation level.

Effect of the Invention

With the regenerative braking apparatus according to the present invention, when a plurality of regenerative braking apparatuses is connected to the power supply apparatus, a lower limit of an operation level calculated, as occasion demands, according to energization time of a regenerative braking apparatus that consumes regenerative power is changed and output and, based on the changed operation level and a monitor output obtained by monitoring the regenerative power, the energization time for the regenerative braking apparatus is controlled. Therefore, there is an effect that, even when the operation levels of the respective regenerative braking apparatuses are not uniform because of component tolerance or the like, it is possible to uniformly actuate the apparatuses, it is unnecessary to connect the apparatuses using control lines or the like, and a fall in reliability of the entire apparatus is not brought about.

Figure 1:
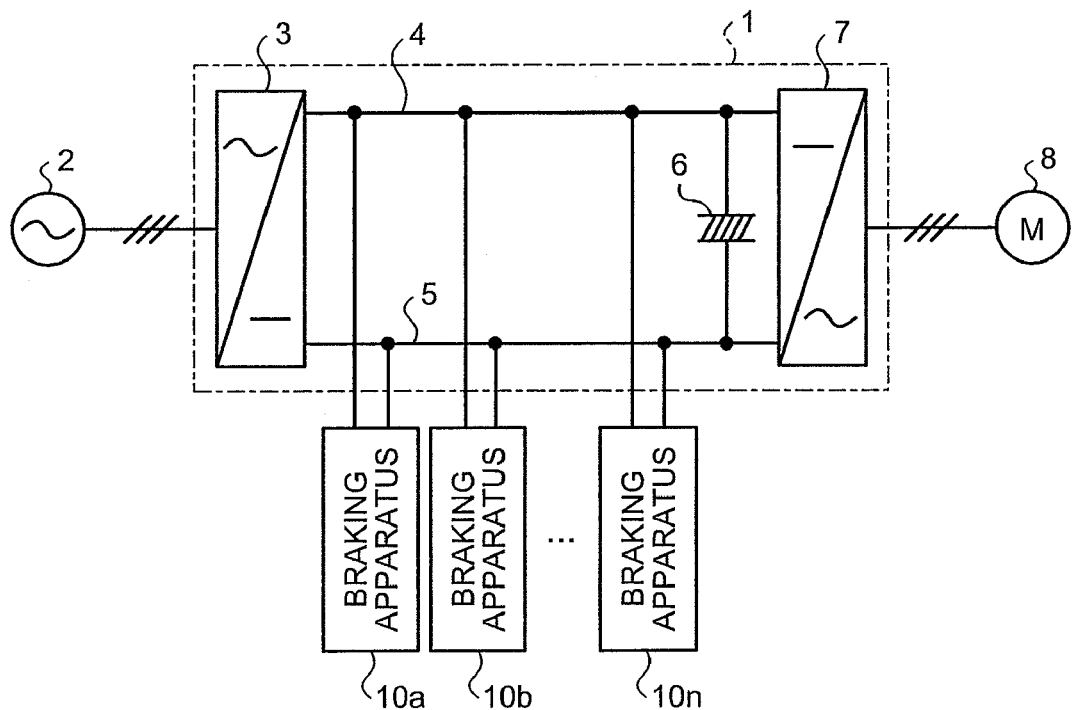
FIG. 1 is a diagram of a connection configuration of regenerative braking apparatuses according to a preferred embodiment of the present invention.

EXPLANATIONS OF LETTERS OR NUMERALS 1 inverter apparatus
2 AC power supply
3 converter unit
4, 5 DC buses
6 smoothing capacitor
7 inverter unit
8 driving motor
10, 10a, 10b, 10n braking apparatus
11 braking resistor
12 switching circuit
14 voltage detector 15 operation level operator
16 comparator
17 driving circuit
18, 19 terminal

BEST MODE(S) FOR CARRYING OUT THE INVENTION

A preferred embodiment of a regenerative braking apparatus according to the present invention is explained in detail below with reference to the drawings. The present invention is not limited by the embodiment. In the embodiment described below, the regenerative braking apparatus is connected to an inverter apparatus as an example. However, the regenerative braking apparatus can also be connected to power supply apparatuses other than the inverter apparatus.

First Embodiment

FIG. 1 is a diagram of a connection configuration of regenerative braking apparatuses according to a preferred embodiment of the present invention. In FIG. 1, an inverter apparatus 1 includes a converter unit 3 that is connected to an AC power supply 2, which is, for example, a three-phase AC power supply, and converts AC power of the AC power supply 2 into DC power, a smoothing capacitor 6 connected to an output side of the converter unit 3, and an inverter unit 7 that reconverts the DC power output from the converter unit 3 into AC power having a variable voltage and a variable frequency. A driving motor 8 that is driven by, for example, three-phase AC power is connected to an output terminal of the inverter apparatus 1, i.e., an output terminal of the inverter unit 7. A plurality of braking apparatuses (regenerative braking apparatuses) 10 (10a, 10b, ..., 10n) is connected in parallel between a pair of DC buses 4, 5 that connect the converter unit 3 and the inverter unit 7.

In FIG. 1, the braking apparatuses 10 convert regenerative power (electric energy) that is regenerated from the driving motor 8 (a load side) to the inverter apparatus 1 side into thermal energy using resistors or the like included therein and consumes the regenerative power. A plurality of braking apparatuses is connected in parallel because, in each braking apparatus, power consumption based on predetermined rating is set. For example, it is assumed that a 200 kW driving motor is connected and 100 kW regenerative power is returned from the driving motor side. In this case, when power consumption rating of 10 braking apparatuses the braking apparatus 10 is 20 kW, because 100 (kW)=20 (kW/braking apparatus)×5 (braking apparatuses), at least 5 braking apparatuses are necessary. Because a braking apparatus having large power consumption rating has large size and is expensive, it is preferable to use braking apparatuses having as small rating as possible. Because of such a reason, it is necessary to operate a plurality of braking apparatuses in parallel.

Figure 2:
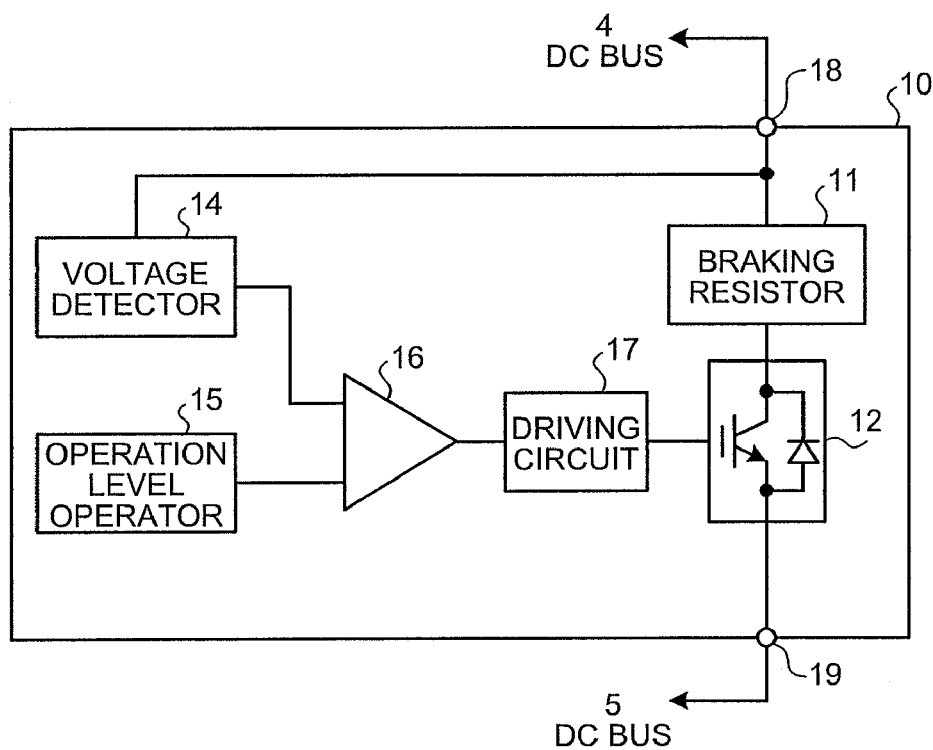
FIG. 2 is a diagram of a detailed configuration of the braking apparatus shown in FIG. 1.

FIG. 2 is a diagram of a detailed configuration of the braking apparatus 10 shown in FIG. 1. In FIG. 2, the braking apparatus 10 includes a braking resistor 11, a switching circuit 12, a voltage detector 14, an operation level operator 15, a comparator 16, and a driving circuit 17. The braking resistor 11 and the switching circuit 12 are inserted in series between terminals 18, 19 connected to the DC buses 4, 5, respectively. The driving circuit 17 controls the switching circuit 12 based on an output of the comparator 16. For example, when the switching circuit 12 is controlled to be turned on, charges accumulated in the smoothing capacitor 6 of the inverter apparatus 1 are discharged through the braking resistor 11 and regenerative power is consumed from the load side in the braking resistor 11.

The operation level operator 15 generates a voltage signal of a predetermined (variable) level explained later. On the other hand, the voltage detector 14 outputs a monitor voltage based on, for example, output voltage (DC voltage) of the DC bus 4 (i.e., the smoothing capacitor 6). The monitor voltage output from the voltage detector 14 is not, for example, a voltage itself of the smoothing capacitor 6 and only has to be a voltage proportional (equivalent) to the voltage of the smoothing capacitor 6. The comparator 16 generates a control signal to the switching circuit 12 based on the monitor voltage output from the voltage detector 14 and an arithmetic output from the operation level operator 15, and controls the switching circuit 12 through the driving circuit 17. For example, when the monitor voltage of the voltage detector 14 is larger than the arithmetic output of the operation level operator 15, it is necessary to consume regenerative power and the switching circuit 12 is controlled to be turned on. On the other hand, when the monitor voltage of the voltage detector 14 is smaller than the arithmetic output of the operation level operator 15, it is unnecessary to consume regenerative power and the switching circuit 12 is controlled to be turned off.

Figure 3:
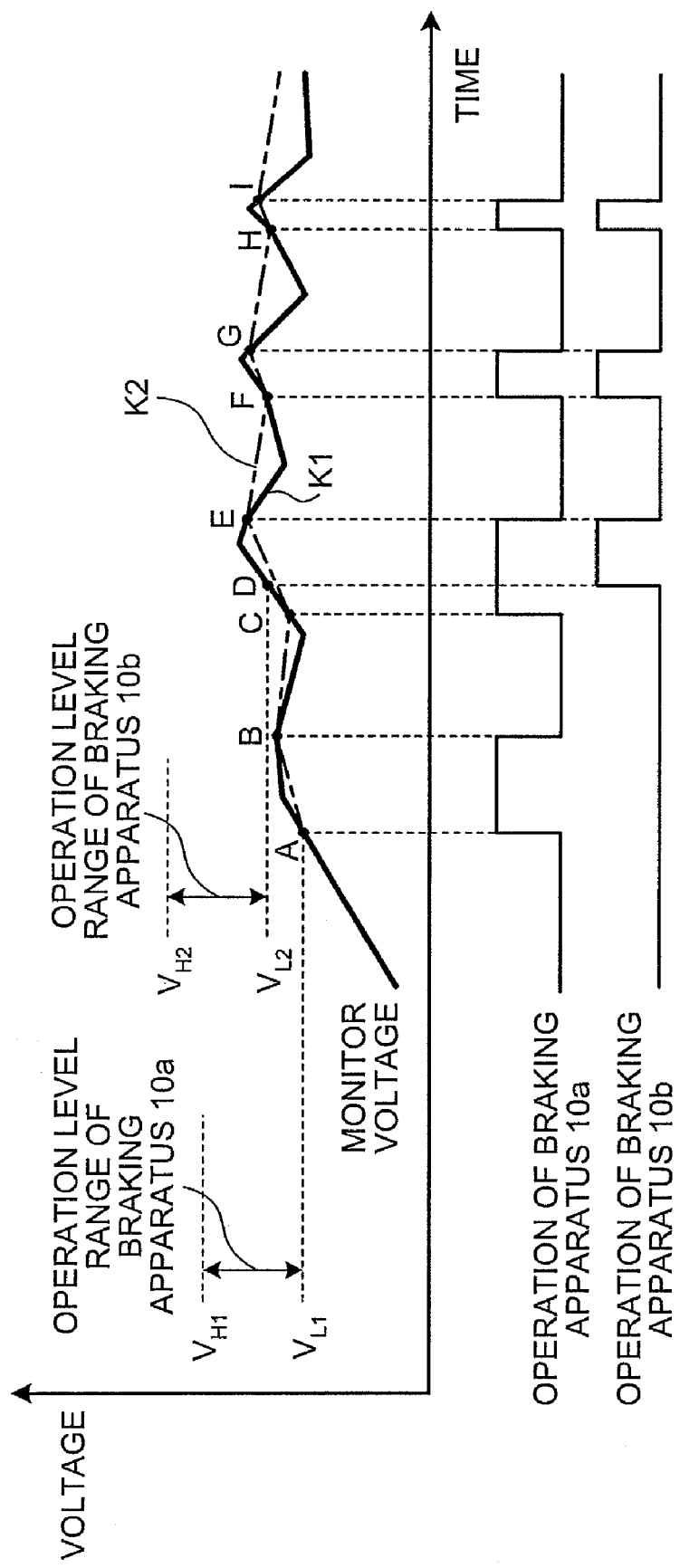
FIG. 3 is a diagram of an example for explaining operations of the regenerative braking apparatuses according to the present invention.

FIG. 3 is a diagram of an example for explaining operations of the regenerative braking apparatuses according to the present invention. More specifically, FIG. 3 is a diagram in which operations at the time when, for example, two braking apparatuses having the configuration shown in FIG. 2 are connected are shown on a time axis. In FIG. 3, a waveform K1 indicated by a solid line is the monitor voltage of the voltage detector 14 and a waveform K2 indicated by an alternate long and short dash line indicates operation level voltage output from an operation level operator of one braking apparatus ("braking apparatus 10a") of the two braking apparatuses.

Voltage levels $V_{L1}$, $V_{H1}$ are voltages for determining an operation level range of the braking apparatus 10a. Voltage levels $V_{L2}$, $V_{H2}$ are voltages for determining an operation level range of the other braking apparatus ("braking apparatus 10b") of the two braking apparatuses. The voltage levels $V_{L1}$, $V_{L2}$ that are lower limits in the operation level range are usually different between the braking apparatuses because of component tolerance or the like as explained above. Therefore, in the example shown in FIG. 3, it is assumed that a lower limit in the operation level range in the braking apparatus 10a is smaller than a lower limit in an operation level range in the braking apparatus 10b. On the other hand, the voltage levels $V_{H1}$, $V_{H2}$ that are upper limits in the operation level range are voltages determined by taking into account withstand voltages and the like of the braking apparatuses. Like the lower limits, as shown in FIG. 3, it is assumed that a value of the braking apparatus 10a is smaller than a value of the braking apparatus 10b. These assumption examples are for convenience only and does not specify or limit operations of the braking apparatuses.

Operations of the regenerative braking apparatuses according to the present invention are explained below with reference to FIG. 3. In the following explanation, it is assumed that, when an electric current flows to the braking resistor 11 of the braking apparatus 10 and regenerative power is consumed, the braking apparatus 10 is in an "on" state and, when an electric current does not flow to the braking resistor 11 and regenerative power is not consumed, the braking apparatus 10 is in an "off" state. A monitor voltage of the voltage detector 14 in the braking apparatus 10a and a monitor voltage of the voltage detector 14 in the braking apparatus 10b take the same value because the voltage at the same terminal is monitored.

Therefore, in the following explanation, the monitor voltages of the voltage detectors in the braking apparatuses are simply explained as "motor voltage" without distinguishing the braking apparatuses 10a, 10b.

First, in a section up to an A point, each monitor voltage is smaller than the operation level lower limit ($V_{L1}$) of the braking apparatus 10a and the operation level lower limit ($V_{L2}$) of the braking apparatus 10b. Therefore, both the braking apparatuses 10a and 10b are in the off state.

Next, in a section from the A point to a B point, the monitor voltage is larger than the operation level lower limit ($V_{L1}$). Therefore, the braking apparatus 10a is turned on. At this point, the braking apparatus 10a performs control for raising an operation level lower limit in the operation level operator 15 of the braking apparatus 10a. Processing for raising the operation level lower limit of the braking apparatus 10a can be performed by using a method of, for example, time-integrating energization time of the braking apparatus 10a. On the other hand, in the braking apparatus 10b, the state in which the monitor voltage is smaller than the operation level lower limit ($V_{L2}$) of the braking apparatus 10b continues. Therefore, the braking apparatus 10b continues to be in the off state.

Next, in a section from the B point to a C point, the monitor voltage is smaller than the operation level lower limit ($V_{L1}$) of the braking apparatus 10a. Therefore, the braking apparatus 10a is turned off. At this point, the braking apparatus 10a performs control for lowering an operation level lower limit of the braking apparatus 10a. On the other hand, the braking apparatus 10b continues to be in the off state following the section from the A point to the B point.

Then, in a section from the C point to an E point, the monitor voltage is larger than the operation level lower limit ($V_{L1}$) of the braking apparatus 10a. Therefore, the braking apparatus 10a is turned on again and performs control for raising an operation level lower limit of the braking apparatus 10a. On the other hand, in a section from the C point to a D point, the braking apparatus 10b continues to be in the off state because the monitor voltage is smaller than the operation level lower limit ($V_{L2}$) of the braking apparatus 10b. However, in a section from the D point to the E point, the monitor voltage is larger than the operation level lower limit ($V_{L2}$) of the braking apparatus 10b. Therefore, the braking apparatus 10b is in the on state. At this point, like the braking apparatus 10a, the braking apparatus 10b performs control for raising an operation level lower limit of the braking apparatus 10b. In the example shown in FIG. 3, to prevent complication of illustration, the operation level lower limit of the braking apparatus 10b is omitted.

In a section after the E point, the states of the braking apparatuses 10a, 10b are changed based on results of comparison between the monitor voltages and the operation level lower limits of the braking apparatuses 10a, 10b. The braking apparatuses perform control for raising or lowering the operation level lower limits of the braking apparatuses according to operation times thereof as explained later. Consequently, fluctuation in the operation level lower limits between the control apparatuses is eliminated. For example, in the example shown in FIG. 3, before the operation is started, the operation level lower limit ($V_{L1}$) of the braking apparatus 10a is smaller than the operation level lower limit ($V_{L2}$) of the braking apparatus 10b. However, because ON time of the braking apparatus 10a is longer than ON time of the braking apparatus 10b, a rate of rise in the operation level lower limit ($V_{L1}$) is higher than a rate of rise in the operation level lower limit ($V_{L2}$) of the braking apparatus 10b. Furthermore, because OFF time of the braking apparatus 10a is shorter than OFF time of the braking apparatus 10b, a rate of fall in the operation level lower limit ($V_{L1}$) of the braking apparatus 10a is lower than a rate of fall in the operation level lower limit ($V_{L2}$) of the braking apparatus 10b. As a result, in the section after the E point shown in FIG. 3, fluctuation in the operation level lower limits between the braking apparatuses 10a, 10b is eliminated and uniformity of operations in the braking apparatuses 10a, 10b is secured.

As explained above, the regenerative braking apparatus according to the preferred embodiment of the present invention is characterized by variably controlling an operation level of the regenerative braking apparatus without depending on operation information (or control information) of the other regenerative braking apparatuses. In other words, it can be said that the regenerative braking apparatus according to the preferred embodiment of the present invention has a self-contained operation level changing function that does not depend on operations of the other regenerative braking apparatuses.

Figure 4:
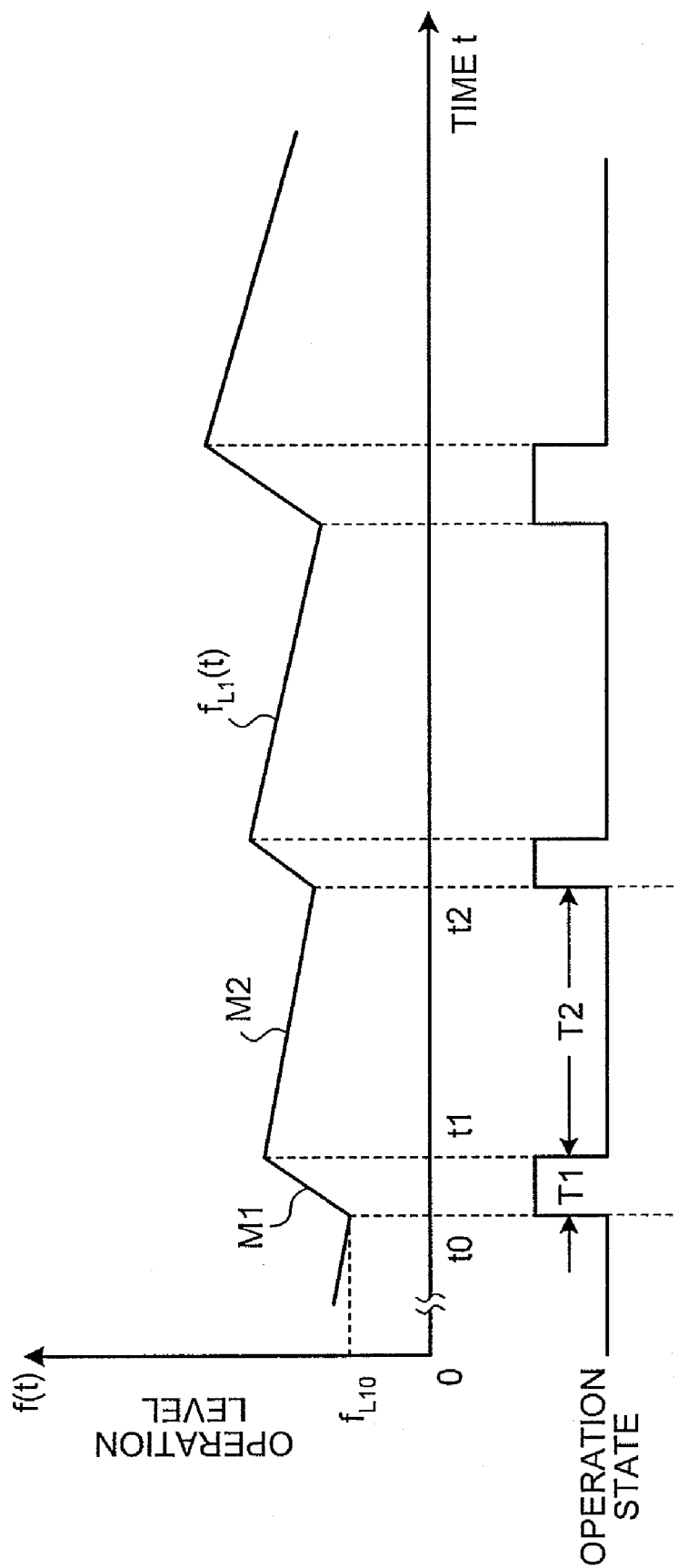
FIG. 4 is a diagram of an example of an output waveform of an operation level lower limit that rises or falls according to operation time of the braking apparatus.

Next, a relation between operation time of the braking apparatus and an operation level of the operation level operator is explained below with reference to FIG. 4. FIG. 4 is a diagram of an example of an output waveform of an operation level lower limit that rises or falls according to operation time of the braking apparatus.

A waveform $f_{L1}(t)$ shown in FIG. 4 indicates an example of an operation level lower limit of the operation level operator that is variably controlled according to operation time. For example, when an operation level lower limit at time t0 is represented as $f_{L10}$, first, during time t0 to t1 (ON time T1) in which the braking apparatus shifts from the off state to the on state and continues to be in the on state, the braking apparatus raises the operation level lower limit from $f_{L10}$ at a predetermined rate of rise (M1). On the other hand, during time t1 to t2 (OFF time T2) in which the braking apparatus shifts from the on state to the off state and continues to be in the off state, the braking apparatus lowers the operation level lower limit from a value at that point at a predetermined rate of fall (M2). If the rate of rise M1 and the rate of fall M2 take positive values, respectively, it is preferable that the rate of rise M1 and the rate of fall M2 has a relation M1>M2.

Apart from the relative relation between the rate of rise M1 and the rate of fall M2, there is an effect that initial fluctuation of operation level lower limit among the braking apparatuses is eliminated early by setting a value of the rate of rise M1 to a relatively large value. On the other hand, there is an effect that it is possible to prevent an operation level lower limit in a non-operating braking apparatus from falling more than necessary by setting a value of the rate of fall M2 to a relatively small value.

In the braking apparatus, allowed time for continuous ON, downtime after continuous ON, and the like are set according to a thermal time constant, a heat radiation ability, and the like of a resistor. Therefore, it is preferable to take into account these characteristics. For example, when the allowable time for continuous ON and the downtime after continuous ON are set to about 1 minute and 5 minutes, respectively, it is suitable to set the rate of rise M1 of the operation level lower limit to 5 to 10 times as large as the rate of fall M2.

In the above explanation, the operation level lower limit is raised at the predetermined rate of rise in the on state of the braking apparatus. However, it goes without saying that the operation level lower limit is not raised to be equal to or higher than an operation level upper limit. The operation level lower limit is lowered at the predetermined rate of fall in the off state of the braking apparatus. However, it goes without saying that the operation level lower limit is not lowered to be equal to or lower than an initially-set operation level lower limit.

In this embodiment, the operation level lower limit is lowered at the predetermined rate of fall in the off state of the braking apparatus. However, when fluctuation of operation level upper limits determined by taking into account withstand voltages and the like of the braking apparatuses is small in the braking apparatuses, the control for lowering the operation level lower limit does not have to be performed when the braking apparatus is in the off state. Even in such control, time ratios of OFF time and ON time between the braking apparatuses, operation level lower limits of which coincide with each other at a certain point, coincide with each other. Furthermore, these relations hold in a chain-like manner with other braking apparatuses. Thus, fluctuation in operation level lower limits among the braking apparatuses is eliminated.

Even when fluctuation in operation level upper limits among the braking apparatuses is relatively large, it is possible to omit the control for lowering the operation level lower limit in the same manner as above by, for example, setting a smallest value among the operation level upper limits in the braking apparatuses as an operation level upper limit common to the braking apparatuses.

As explained above, with the regenerative braking apparatus according to this embodiment, when a plurality of regenerative braking apparatuses is connected to a power supply apparatus such as an inverter apparatus, based on a result of comparison between an operation level calculated according to energization time of a regenerative braking apparatus that consumes regenerative power and a monitor output obtained by monitoring the regenerative power, the energization time for the regenerative braking apparatus is controlled. Therefore, even when the operation levels of the respective regenerative braking apparatuses are not uniform because of component tolerance or the like, it is possible to uniformly actuate the apparatuses. Moreover, in the regenerative braking apparatus according to this embodiment, because it is unnecessary to connect the apparatuses using control lines or the like, a fall in reliability of the entire apparatus is not brought about.

INDUSTRIAL APPLICABILITY

As explained above, the regenerative braking apparatus according to the present invention is useful when a plurality of regenerative braking apparatuses is connected in parallel to a power supply apparatus such as an inverter apparatus. In particular, the regenerative braking apparatus is suitable for securing uniformity of operations among the regenerative braking apparatuses.

The invention claimed is:

1. A regenerative braking apparatus that is connected to a power supply apparatus that supplies electric power to a load, and consumes regenerative power regenerated from a load side together with other regenerative braking apparatuses that are connected to the power supply apparatus, the regenerative braking apparatus comprising:
    a consuming unit that consumes the regenerative power;
    an energizing unit that energizes the consuming unit with the regenerative power;
    a monitoring unit that monitors the regenerative power;
    an operation-level changing unit that calculates a lower limit of an operation level for judging whether the energizing unit should be actuated according to a time integral of an energization time of the consuming unit, and changes and outputs the calculated lower limit of the operation level;
    a comparing unit that compares the lower limit of the operation level output from the operation-level changing unit and a monitor output of the monitoring unit; and
    a driving unit that drives the energizing unit based on a result of the comparison by the comparing unit,
    wherein the energizing unit operates when the monitor output exceeds the lower limit of the operation level.

2. The regenerative braking apparatus according to claim 1, wherein the operation-level changing unit sets, when the calculated lower limit of the operation level exceeds the lower limit of an operation level set in advance, the calculated operation level as a new lower limit and changes the new lower limit during operation of the consuming unit.

3. The regenerative braking apparatus according to claim 2, wherein the operation-level changing unit holds the lower limit of an operation level during non-operation of the consuming unit.

4. The regenerative braking apparatus according to claim 2, wherein the operation-level changing unit changes the lower limit of an operation level during non-operation of the consuming unit.

5. The regenerative braking apparatus according to claim 4, wherein a rate of change in changing the lower limit of an operation level during operation of the consuming unit is larger than a rate of change in changing the lower limit of an operation level during non-operation of the consuming unit.

* * * * *